3,066,126
DIENE POLYMERIZATION CATALYST
Lee M. Porter, Concord, and Jaroslav G. Balas, Orinda, Calif., assignors to Shell Oil Company, a corporation of Delaware
No Drawing. Filed Sept. 9, 1958, Ser. No. 759,858
16 Claims. (Cl. 260—94.3)

This invention relates to improvements in the polymerization of conjugated dienes. More particularly it relates to processes for the polymerization of conjugated dienes by the employment of novel polymerization catalysts.

It has been reported that conjugated dienes, as butadiene, isoprene, and the like, may be polymerized to produce cis 1,4-addition products by conducting the polymerization in the presence of certain organo-metallic catalysts. The products thus obtained are useful in the formation of rubber compositions. Those processes, however, have certain disadvantages which the present invention overcomes. For one thing, the prior art processes for the polymerization of conjugated dienes usually results in a product which contains substantial portions of catalyst residues which are not readily separated from the polymer. The catalyst residues, which remain in the polymer, are undesirable because they reduce the stability of the polymer and may hasten degradation and cross-linking. Another disadvantage is that the catalysts are expensive and difficult to handle. Additionally, the cis 1,4-addition products very often are of varying molecular weight from one batch to the next because the polymerization is very sensitive to variation in the catalyst composition.

It is an object of this invention to provide novel catalysts for the polymerization of conjugated dienes. It is another object of this invention to provide novel catalysts for the polymerization of conjugated dienes which will produce polymer having a high cis 1,4-content. It is still another object of this invention to provide novel polymerization catalyst and processes for the polymerization of conjugated dienes which catalysts are abundant, inexpensive and easy to handle. It is still another object of this invention to provide simple processes for the polymerization of conjugated dienes which processes employ the novel catalysts to produce polymer of uniform molecular weight. Other objects will become apparent as the description of the invention proceeds.

These and other objects are accomplished by the process comprising polymerizing a conjugated diene at temperatures ranging from 0° C. to about 150° C. in the presence of a catalyst which is a reaction product of an acidic metal halide, a transition metal halide and an alkyl aluminum prepared in a liquid hydrocarbon, the mole ratio of the acidic metal halide to the transition metal halide being greater than 1. In considering the two metal halides, it will be understood that the metals will always be different. Thus an acid metal halide as titanium tetrahalide and a transition metal halide as titanium trihalide normally will not be used together.

As previously indicated the present invention is directed to the polymerization of conjugated dienes such as isoprene, chloroprene, butadiene, and similar conjugated dienes. In the preferred embodiment the processes of this invention are particularly suited to the polymerization of conjugated dienes having from 4 to 8 carbon atoms with the species of butadiene being particularly suited. Accordingly, the invention is described in greater detail as it relates to the polymerization of butadiene but it will be understood that other conjugated dienes may be similarly polymerized. The monomeric conjugated diene preferably is in a form that is substantially free of impurities such as water, oxygen, oxygen-containing compounds, sulfur, sulfur-containing compounds, and the like. The present invention, however, may be employed for the polymerization of a mixture of conjugated dienes as isoprene-butadiene, chloroprene-butadiene, and the like.

The monomeric conjugated diene at the beginning of the polymerization is contained in solution with a hydrocarbon diluent. Among the hydrocarbon diluents aromatic hydrocarbons are preferred. Good results are also obtained with mixtures of liquid hydrocarbons wherein only a portion thereof is an aromatic or cyclic hydrocarbon. In the most preferred embodiment benzene is used as the sole diluent for the conjugated diene although alkylated benzenes may be employed. Among the other hydrocarbons that may be employed there may be mentioned toluene, the xylenes, mesitylene, ethylbenzene and other normally liquid cyclic compounds. Cyclic compounds having active unsaturation in alkyl radicals are less preferred as they may copolymerize. Aliphatic hydrocarbons which may be employed include, for example, hexane, octane, isooctane, and the like, but such diluents are best employed in admixture with an aromatic hydrocarbon as benzene. When mixed hydrocarbon diluents are employed good results are obtained if the aromatic hydrocarbon is present in the order of about 5%, by weight, or higher.

The solution of the conjugated diene in the diluent may range from about 5%, by weight, to about 25%, by weight. Variations within this range may be made as desired in order to control viscosity and molecular weight of the polymer. At lower concentrations the viscosity of the polymer solution and the molecular weight of the polymer will be lower.

The novel catalysts of this invention are formed from three essential ingredients, i.e., an acidic metal halide, a transition metal halide and an alkyl aluminum, all of which preferably are employed in substantially pure and anhydrous forms. Of the acidic metal halides, aluminum halides are preferred with the chloride being particularly preferred followed by aluminum bromide and the other aluminum halides all of which may be pretreated to remove moisture. Aluminum chloride that has been resublimed is found to be particularly outstanding for the production of cis 1,4-polymer of conjugated dienes but represents an unnecessarily pure form of the halide. Other acidic metal halides that may be used in this invention include the halides of zinc, ferric, stannic, titanium (IV), and the like with the chlorides thereof being best.

The transition metal halide is not limited to any particular species but it is best to employ a metal halide of group VIII of the periodic table, particularly those appearing in the first long period of the periodic table including particularly cobalt and nickel. Other transition metal halides may be employed but they are considerably less suitable by reason of yield, conversions, rate of reaction, and quality of the polymer which is ultimately produced. The halides of the transition metals in order of preference include first the chlorides, followed by the bromides with the others being less suitable for the same reasons outlined above.

The essential third component of the catalyst is termed an "alkyl aluminum" compound and includes, for example, alkyl aluminum halide, trialkyl aluminum and mixtures thereof. Representative alkyl aluminums include those represented by the formula $Al(R)_3$ wherein R may be the same or different alkyl radicals of 1 to 10 carbon atoms such as methyl, ethyl, propyl, butyl, isobutyl, octyl, nonyl and the like. In the preferred embodiment the Rs are lower alkyls having from 1 to 4 carbon atoms with ethyl being particularly preferred. Other alkyl aluminum compounds include those of the formula $AlR_2X$ wherein R is as above and X is hydrogen or halogen as chlorine, bromine and the like. The alkyl aluminum compound may also be those of the formula AlRX$_2$ wherein R and X are as above. Of the numerous alkyl aluminum compounds the aluminum alkyl sesquihalides are preferred with the species of aluminum ethyl sesquichloride being particularly preferred. Thereafter the dialkyl aluminum halides are preferred followed by trialkyl aluminums.

The present invention may be adapted to produce any of the several forms of polymer by varying the selection of the components used to prepare the catalyst. This may be illustrated by making reference to polymer produced from butadiene which may appear in several forms such as the various 1,2-addition products, the trans 1,4-addition product and the most preferred species of cis 1,4-addition product. A polymer having a high cis 1,4-addition product of polybutadiene is easily obtained when the catalyst is prepared from the most preferred components, e.g., cobalt chloride, aluminum chloride and aluminum ethyl sequichloride. Such a polymer will have a cis 1,4-content in the order of 95–98% or even higher. On the other hand, when a polymer is prepared from butadiene and a catalyst prepared with a group IV transition metal halide, as a titanium or zirconium chloride, it will be found that the cis content is substantially reduced and the trans 1,4-content is increased. While the catalysts of this invention are formed from essentially these components it will be appreciated that the catalyst may be suitably prepared from two or more components within each group without departing from the spirit of this invention.

It is an outstanding advantage of the present invention that the catalysts are very simple to prepare. In essence all that is required is that the catalyst components be mixed in a hydrocarbon diluent of the type previously described and the reaction product be permitted to form. Preferably the hydrocarbon diluent for the monomer and the catalyst preparation should be the same and accordingly benzene or a benzene-containing mixture is preferred for the catalyst preparation. The catalyst formation is hastened if the hydrocarbon diluent containing the catalyst components is refluxed for a period ranging from a few minutes to a few hours. Alternatively, the catalyst may be permitted to form from the components by merely allowing the mixture to stand for several hours. Best results are obtained however when the maximum amount of the catalyst components react and go into solution in the hydrocarbon diluent. One method of proceeding is to add the catalyst components to the hydrocarbon diluent, the mixing is heated and thereafter the excess solids are removed by filtering, centrifuging, or decanting. The catalyst is then in a soluble form which is contained in the hydrocarbon diluent. This technique produces an active form of catalyst. A very substantial advantage is that the catalyst is free of solids which would otherwise be mixed with the polymer to produce a product having less desirable qualities because of the adverse effect of large amounts of the catalyst residues. Another technique for the preparation of the catalysts of this invention comprises proceeding as above but excluding the alkyl aluminum, e.g. aluminum alkyl sesquihalide, initially. After the other two components have been heated in the hydrocarbon diluent and the solids separated, the third component, which is normally a liquid, may be added to yield the reaction product.

According to the present invention the catalyst components are charged to the hydrocarbon diluent so that the mole ratio of the acidic metal halide to the transition metal halide is greater than one in the final catalyst. The specific quantities of the components which are added to the hydrocarbon diluent will vary depending upon the solubilities of the particular components and the hydrocarbon diluent employed but in general it is always preferred to add an excess over that which will go into solution in the hydrocarbon diluent and the excess of the solid component may thereafter be separated. In the most preferred procedures the mole ratios of the above two components are in the order of about 2:1 to about 5:1, respectively, as it is found that the soluble catalyst contains the metal components within that ratio. The third component, i.e., the alkyl aluminum may be present in any amount in excess of zero moles.

One of the principal advantages of the present invention is that the polymer will contain only small amounts of the transition metal. This is important because larger amounts of transition metal may cause the rubber to cross-link or deteriorate on aging. Aluminum on the other hand has far less, if any, tendency to promote oxidative degradation or cross-linking. Another advantage is that the present invention is less sensitive to impurities and thereby permitting greater latitude in operations. Still another advantage is that the present catalysts will permit very fast polymerization rates thereby allowing mass production by continuous production techniques. Yet another advantage is that the present catalyst will not readily alkylate the diluent whereas the converse may sometimes be true using other catalysts.

The quantity of the catalyst components that go into solution will vary widely depending on the choice of the components and the diluent, or solvent. As to the acidic metal halide and the transition metal halide the total may range from about 2 to 50,000 p.p.m. of the diluent. More often however the range will be in the order of 5 to 2,000 p.p.m. This will be seen to be quite low and a surprising feature of this invention is that such excellent results are obtained with small catalyst concentrations. The alkyl aluminum contained in the diluent may be present in only trace amounts and yet afford substantial advantages. As the amount is increased the advantages are correspondingly increased and become quite pronounced at about 5 moles per mole of the transition metal. Highly suitable results are obtained with about 100 moles per mole of the transition metal. Thereafter improvements are less pronounced and by about 1000 moles per mole of the transition metal only small advantages may be realized.

The catalyst may be prepared in any suitable vessel that is closed to the atmosphere. Desirably, the vessel is flushed with an inert gas, as nitrogen, before the various ingredients are charged. Caution should be exercised as the components are added as the formation of the catalyst may be accompanied by the evolution of heat and cooling may be necessary. It is the better practice to store the catalyst in glass or glass lined vessels although the catalyst may be suitably stored in vessels of Hastelloy B or C or tantalum.

In conducting the polymerizations of this invention temperatures ranging from about —40° C. to about 150° C. may be employed. The particular temperature selected will vary depending upon certain variables which are inherent in the process. For example, thet present invention is characterized by fast polymerization rates. In some cases it may be desirable therefore to conduct the polymerization at lower temperatures to slow down the polymerization. The slowdown of the polymerization in such cases facilitates production control and minimizes the danger of damaging the polymerization apparatus. In other cases, particularly where the catalyst is less active, it may be desirable to operate at the higher temperature, i.e., in the order of 40–100° C. or even 150° C. Another outstanding advantage of this invention is that the polymerization, in most cases, may be conducted easily at about room temperatures thereby minimizing the cost of heat transfer equipment.

Another means of controlling the rate of polymerization is by adjusting the amount of catalyst employed, which amounts vary depending on the particular components contained in the catalyst. In the most preferred embodiments, i.e., using a catalyst prepared from cobalt chloride and aluminum chloride, for example, very fast polymerizations are obtained with as little as 1 p.p.m. of cobalt based on the weight of the total reaction mixture. By reducing the amount, i.e. to .1 p.p.m. slower rates are obtained. With higher amounts, i.e. in the order of 20 p.p.m.

the reaction may be so fast as to present the danger of damaging the apparatus. With other species of metal halides the rates will differ so that, in general, the amount of complex that is employed may vary from .01 to 200 p.p.m. of the transition metal based on the total reaction mixture. The alkyl aluminum component will be present, as part of the total reactants, in the proportions previously indicated.

Another advantage of the present processes for polymerizing conjugated dienes is that the polymerizations are conducted at low pressures in the preferred procedures. In actual practice all that is normally required is that the polymerization reactor be sealed so as to exclude the atmosphere from the reactor. This is desirable because oxygen and moisture are harmful to the polymerization. Accordingly, in the preferred embodiment it will be found that atmospheric pressures are suitable when the polymerization is conducted at about room temperatures. When the polymerization is conducted at higher temperatures then higher pressure will be created within the reactor but in almost all instances it is unnecessary to increase the pressure from external sources. The preferred pressures are suitably defined as "autogenic pressures" which refers to the pressure created by the system under the conditions of reaction. Such pressures will vary depending upon the temperature, the nature and quantity of the diluent, and the like.

The polymerization may be begun by merely charging the catalyst to a solution of a conjugated diene in the hydrocarbon diluent while agitating the contents of the reactor. The catalyst is added to the reactor in such a manner that it does not come in contact with the atmosphere. Accordingly, the reactor is equipped with suitable fixtures to permit such charging of the catalyst and the conjugated diene. A typical procedure comprises preparing a solution of the conjugated diene in a separate vessel and thereafter metering the thus prepared solution to the reactor. If desired, the solution of the conjugated diene in the hydrocarbon diluent may be prepared in the polymerization reactor. It is best that the monomeric conjugated diene and catalyst be thoroughly mixed from the start and in a batch reactor this is simply accomplished by agitation while adding the catalyst. In continuous operations, which employ, for example, a tubular reactor, this may be accomplished by feeding the catalyst in at a point near the inlet for the diene. In batch and continuous operations the residence time of the polymerization mixture is controlled by any suitable means which are shown in the art.

As the polymerization proceeds the polymer will form and remain in solution so that at the end of the polymerization cycle a viscous liquid is obtained. The polymer is recovered by the addition of a coagulating agent as acetone, a lower alcohol, such as methanol, ethanol, or the like, whereupon a coagulum of the polymer is formed. The polymer is then recovered by merely separating the solid polymer from the liquid. It is another advantage of this invention that the coagulum need not be treated further in order to separate catalyst residues as the residues are sufficiently low after the first coagulation. This is of considerable importance since several washings of the polymer were necessary heretofore.

In addition to butadiene and isoprene, other conjugated dienes that may be polymerized according to the present invention include 2,3-dimethyl-1,3-butadiene, 2-ethyl-1,3-butadiene, 4-methyl-1,3-hexadiene, 2-methyl-1,3-pentadiene, 2-isopropyl-1,3-butadiene, 2-amyl-1,3-butadiene, piperylene and the like, as well as mixtures thereof.

The present invention is described in greater detail in the following examples.

*Example 1*

To a flask which is purged with nitrogen to remove air is added 11 grams of aluminum chloride and 1 gram of cobalt chloride followed by 80 milliliters of benzene. After refluxing for several hours in the presence of nitrogen the contents of the flask are cooled to room temperature. There is obtained a solid layer on the bottom of the flask and an upper liquid layer which is a clear emerald green color. Ten milliliters of the green solution are then mixed with .5 ml. of a 3 molar solution of aluminum ethyl sesquichloride in benzene. Thereafter one milliliter of the mixture is added to 50 milliliters of a saturated solution of butadiene in benzene whereupon polymerization begins. The polymerization is at room temperature and normal pressure with constant agitation. After about 3 minutes the polymer solution becomes very viscous and the polymerization is ended by the addition of about 50 mls. of methanol whereupon a solid coagulates. The coagulum is identified as polybutadiene having a cis 1,4-content of about 97.7% and the balance being about equal quantities of the 1,2- and trans 1,4-units. Analysis is made by infrared spectrum of the polymer film. The polymer has an intrinsic viscosity of 4.45 dl./gm., determined in toluene at 25° C.

*Example 2*

The procedure of Example 1 is repeated in all respects except that the catalyst comprising the green solution and the solution of aluminum ethyl sesquichloride is aged for 5 days at room temperature before being used in the polymerization. The resultant product has a cis 1,4-content of 98.1% and the intrinsic viscosity is substantially the same.

*Example 3*

The procedure of Example 1 is repeated except that the polymerization catalyst is prepared with 45 moles of aluminum ethyl sesquichloride per mole of $CoCl_2$. In this case the polymerization is so rapid as to be virtually uncontrollable.

*Example 4*

The procedure of Example 1 is repeated except that 2 milliliters of a .41 molar solution of triisobutyl aluminum is added to 10 ccs. of the clear emerald green liquid. Thereafter 2 ccs. of the resultant solution is used to polymerize a saturated solution of butadiene in 50 milliliters of benzene. The polymerization is conducted at normal temperature and pressure with constant agitation. After 5 minutes the polymerization solution is very viscous whereupon about 50 ccs. of isopropyl alcohol is added to the liquid and the resulting coagulum is separated by filtering. The polymer contains 98.3% cis 1,4-polybutadiene and has an intrinsic viscosity of 6.3.

*Example 5*

The procedure for catalyst preparation described in Example 1 is repeated except that the first catalyst solution is prepared from .2 gram of cobalt chloride and .5 cc. titanium tetrachloride as a 21%, by weight, solution in benzene. These components are refluxed for several minutes in benzene and the liquid fraction, which is a clear green solution as in Example 1, is separated. Thereafter 1 milliliter of a 3 molar solution of aluminum diethyl chloride in benzene is added to the green solution. A saturated solution of butadiene in 50 milliliters of benzene is then polymerized with about 2 milliliters of the catalyst solution thus prepared. In this case the polymerization is terminated after about 10 minutes of reaction at normal temperature and pressures. The product which is therefore coagulated contains about 60% of the cis 1,4-addition product.

*Example 6*

To a flask containing 100 ccs. of benzene is added 20 grams of zinc chloride and 2 grams of cobaltous chloride. The mixture is allowed to stand for several hours and thereafter .5 cc. of aluminum diethyl hydride is added. The mixture is agitated for several minutes and the liquid fraction is separated. With one milliliter of the liquid fraction 50 milliliters of a saturated solution of butadiene is polymerized as in Example 1. The polymer which is recovered has a cis-content of about 98%.

Example 7

The procedure of Example 1 is repeated except that the aluminum chloride is replaced with an equivalent amount of aluminum bromide. In this case the polymer has a slightly lower cis 1,4-content.

Example 8

The procedure of Example 1 is repeated except that the cobalt chloride is replaced with nickel chloride. The polymer which is recovered has a cis 1,4-content of about 90%. In a companion experiment a mixture of about equimolar portions of cobalt chloride and nickel chloride are used. In this case the cis-content is about 98% and the intrinsic viscosity appears to be lower.

Example 9

The procedure of Example 1 is repeated except that isoprene is polymerized. In this case the polymer that is isolated has a substantially lesser amount of the cis 1,4-addition product.

While the cis 1,4-addition products find greatest utility in the manufacture of rubber products, particularly in the manufacture of tread stock for automobile and truck tires, polymers having substantial amounts of the trans 1,4-addition product and/or the 3,4-addition products are also useful for the production of rubber products which do not require the same physical properties. From the foregoing description it will be readily apparent that the various addition products may be prepared by varying, for example the catalyst components, conditions of reaction and the like. Such variations however will be understood to be within the spirit of this invention.

We claim as our invention:

1. A composition comprising the solids-free hydrocarbon solution formed by admixing
    (A) the solution obtained by combining a metal halide selected from the group consisting of cobaltous halide and nickelous halide and an acidic metal halide wherein the metal is selected from the group consisting of aluminum, zinc, ferric, stannic and titanium (IV) in a hydrocarbon solvent, holding the combined ingredients until said metal halides have combined to form a hydrocarbon soluble reaction product dissolved in said solvent, and removing any remaining solids from the resulting solution, with
    (B) an aluminum alkyl.

2. A composition comprising the solids-free solution formed by admixing
    (A) the solution obtained by combining cobaltous chloride and aluminum chloride, in a molar ratio of Al:Co greater than 1:1, in a hydrocarbon solvent, holding the combined ingredients until a hydrocarbon-soluble reaction product of $CoCl_2$ and $AlCl_3$ has been formed and dissolved in said solvents and removing any remaining solids from the resulting solution, with
    (B) at least 5 molecules, per atom of cobalt in solution, of an aluminum alkyl.

3. A composition comprising the solids-free solution formed by admixing
    (A) the solution obtained by combining cobaltous chloride and aluminum chloride in a hydrocarbon solvent, holding the combined ingredients until a hydrocarbon-soluble reaction product of $CoCl_2$ and $AlCl_3$ has been formed and dissolved in said solvent and removing any remaining solids from the resulting solution, with
    (B) at least 5 molecules, per atom of cobalt in solution, of an aluminum alkyl.

4. The composition of claim 3 wherein said hydrocarbon solvent contains benzene.

5. The composition of claim 3 in which the aluminum alkyl is aluminum trialkyl.

6. The composition of claim 3 wherein said aluminum alkyl is an aluminum alkyl halide.

7. The composition of claim 6 in which the aluminum alkyl is aluminum diethyl chloride.

8. The composition of claim 6 in which the aluminum alkyl is aluminum ethyl sesquichloride.

9. A process comprising polymerizing a conjugated diene by contacting it in solution in a liquid hydrocarbon at temperatures ranging from $-40°$ to $150°$ C. with a hydrocarbon solution of a catalyst formed by admixing
    (A) the solution obtained by combining a metal halide selected from the group consisting of cobaltous halide and nickelous halide and an acidic metal halide wherein the metal is selected from the group consisting of aluminum, zinc, ferric, stannic and titanium (IV) in a hydrocarbon solvent, holding the combined ingredients until said metal halides have combined to form a hydrocarbon soluble reaction product dissolved in said solvent, and removing any remaining solids from the resulting solution, with
    (B) an aluminum alkyl.

10. A process comprising polymerizing butadiene by contacting it at temperatures in the range from $-40°$ to $150°$ C. with a hydrocarbon solution comprising
    (A) from 0.01 to 20 p.p.m. of cobalt, in the form of a hydrocarbon soluble reaction product obtained by combining cobaltous chloride and aluminum chloride, in a molar ratio of Al:Co greater than 1:1, in a hydrocarbon solvent, holding the combined ingredients until a hydrocarbon-soluble reaction product of $CoCl_2$ and $AlCl_3$ has been formed and dissolved in said solvent, and removing any remaining solids from the resulting solution, with
    (B) at least 5 molecules, per atom of cobalt in solution, of an aluminum alkyl.

11. A process comprising polymerizing butadiene by contacting it at a temperature in the range from $-40°$ to $150°$ C. with a hydrocarbon solution comprising
    (A) from 0.01 to 20 p.p.m. of cobalt, in the form of a hydrocarbon soluble reaction product obtained by combining cobaltous chloride and aluminum chloride, in a hydrocarbon solvent, holding the combined ingredients until a hydrocarbon-soluble reaction product of $CoCl_2$ and $AlCl_3$ has been formed and dissolved in said solvent, and removing any remaining solids from the resulting solution, with
    (B) at least 5 molecules, per atom of cobalt in solution, of an aluminum alkyl.

12. The process of claim 11 wherein the hydrocarbon solvent in said first-mentioned hydrocarbon solution in which butadient is polymerized contains at least 5 percent of an aromatic hydrocarbon.

13. The process of claim 11 in which the aluminum alkyl is aluminum trialkyl.

14. The process of claim 11 wherein said aluminum alkyl is an aluminum alkyl halide.

15. The process of claim 14 in which the aluminum alkyl is aluminum diethyl chloride.

16. The process of claim 14 in which the aluminum alkyl is aluminum ethyl sesquichloride.

References Cited in the file of this patent

UNITED STATES PATENTS

| | | |
|---|---|---|
| 2,832,759 | Nowlin et al. | Apr. 29, 1958 |
| 2,953,554 | Miller | Sept. 20, 1960 |
| 2,953,556 | Wolfe | Sept. 20, 1960 |
| 2,977,349 | Brockway | Mar. 28, 1961 |
| 3,005,811 | Youngman | Oct. 24, 1961 |

FOREIGN PATENTS

| | | |
|---|---|---|
| 534,792 | Belgium | Jan. 31, 1955 |
| 543,292 | Belgium | June 2, 1956 |
| 789,781 | Great Britain | Jan. 29, 1958 |

OTHER REFERENCES

Coates: "Organo Metallic Compounds," first edition (1956), see pages 80–83, New York, John Wiley & Sons.